(12) United States Patent
Narayanasamy et al.

(10) Patent No.: US 12,289,047 B2
(45) Date of Patent: *Apr. 29, 2025

(54) POWER STEALING USING A CURRENT TRANSFORMER

(71) Applicant: Texas Instruments Incorporated, Dallas, TX (US)

(72) Inventors: Navaneeth Kumar Narayanasamy, Coimbatore (IN); Manu Balakrishnan, Kollam (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,119

(22) Filed: Feb. 26, 2024

(65) Prior Publication Data

US 2024/0195285 A1 Jun. 13, 2024

Related U.S. Application Data

(63) Continuation of application No. 17/406,762, filed on Aug. 19, 2021, now Pat. No. 11,962,234.

(51) Int. Cl.
*H02M 1/08* (2006.01)
*H02M 1/088* (2006.01)
*H02M 1/32* (2007.01)
*H02M 7/217* (2006.01)

(52) U.S. Cl.
CPC ............. *H02M 1/088* (2013.01); *H02M 1/32* (2013.01); *H02M 7/217* (2013.01)

(58) Field of Classification Search
CPC ......... H02M 1/088; H02M 1/32; H02M 7/217
See application file for complete search history.

(56) References Cited

U.S. PATENT DOCUMENTS 10,374,517 B2   8/2019  Tomita
11,962,234 B2 * 4/2024  Narayanasamy ..... H02M 1/088
2014/0239874 A1  8/2014  Inoue

\* cited by examiner

*Primary Examiner* — Rafael O De Leon Domenech
(74) *Attorney, Agent, or Firm* — Charles F. Koch; Frank D. Cimino (57) ABSTRACT

A circuit includes a first rectifier having a first rectifier input and a first rectifier output. The circuit also includes a bridge circuit and a second rectifier. The bridge circuit is coupled to the first rectifier output. The bridge circuit has first, second, third, and fourth terminals. The first and second terminals are coupled to the first rectifier output, and the third and fourth terminals are adapted to be coupled to a primary winding of a transformer. The second rectifier has a second rectifier input and a second rectifier output. The second rectifier input is adapted to be coupled to a secondary winding of the transformer.

12 Claims, 8 Drawing Sheets

SWITCHING TABLE

| GATE SIGNAL | FIRST QUARTER (T/4) | SECOND QUARTER (T/4) | THIRD QUARTER (T/4) | FOURTH QUARTER (T/4) |
|---|---|---|---|---|
| VG1 (Q1) | OFF | ON | ON | OFF |
| VG2 (Q2) | ON | ON | OFF | OFF |
| VG3 (Q3) | ON | OFF | OFF | ON |
| VG4 (Q4) | OFF | OFF | ON | ON |
|  | 301 | 302 | 303 | 304 |

POWER STEALING USING A CURRENT TRANSFORMER

CROSS-REFERENCE TO RELATED APPLICATIONS

The present application is a continuation U.S. patent application Ser. No. 17/406,762, filed Aug. 19, 2021, and is hereby incorporated herein by reference in its entirety.

BACKGROUND

Solid-state relays are used in a variety of applications. In one type of application, there may not be a continuous source of power for the circuit that controls the solid-state relay switches. In such an example, the control circuit for the solid-state relay may be powered from a voltage generated by a secondary winding of a transformer, whose primary winding is coupled across the switches of the solid-state relay. When the solid-state relay is turned on (e.g., to turn on a motor or other type of load), the voltage across the solid-state relay switches is reduced to approximately zero volts. When that happens, the voltage to power the solid-state relay's control circuit is unavailable. Accordingly, proper functioning of a solid-state relay in such applications is problematic.

SUMMARY

In one example, a circuit includes a first rectifier having a first rectifier input and a first rectifier output. The circuit also includes a bridge circuit and a second rectifier. The bridge circuit is coupled to the first rectifier output. The bridge circuit has first, second, third, and fourth terminals. The first and second terminals are coupled to the first rectifier output, and the third and fourth terminals are adapted to be coupled to a primary winding of a transformer. The second rectifier has a second rectifier input and a second rectifier output. The second rectifier input is adapted to be coupled to a secondary winding of the transformer.

BRIEF DESCRIPTION OF THE DRAWINGS

The same reference number is used in the drawings for the same or similar (either by function and/or structure) features.

DETAILED DESCRIPTION

Figure 1:
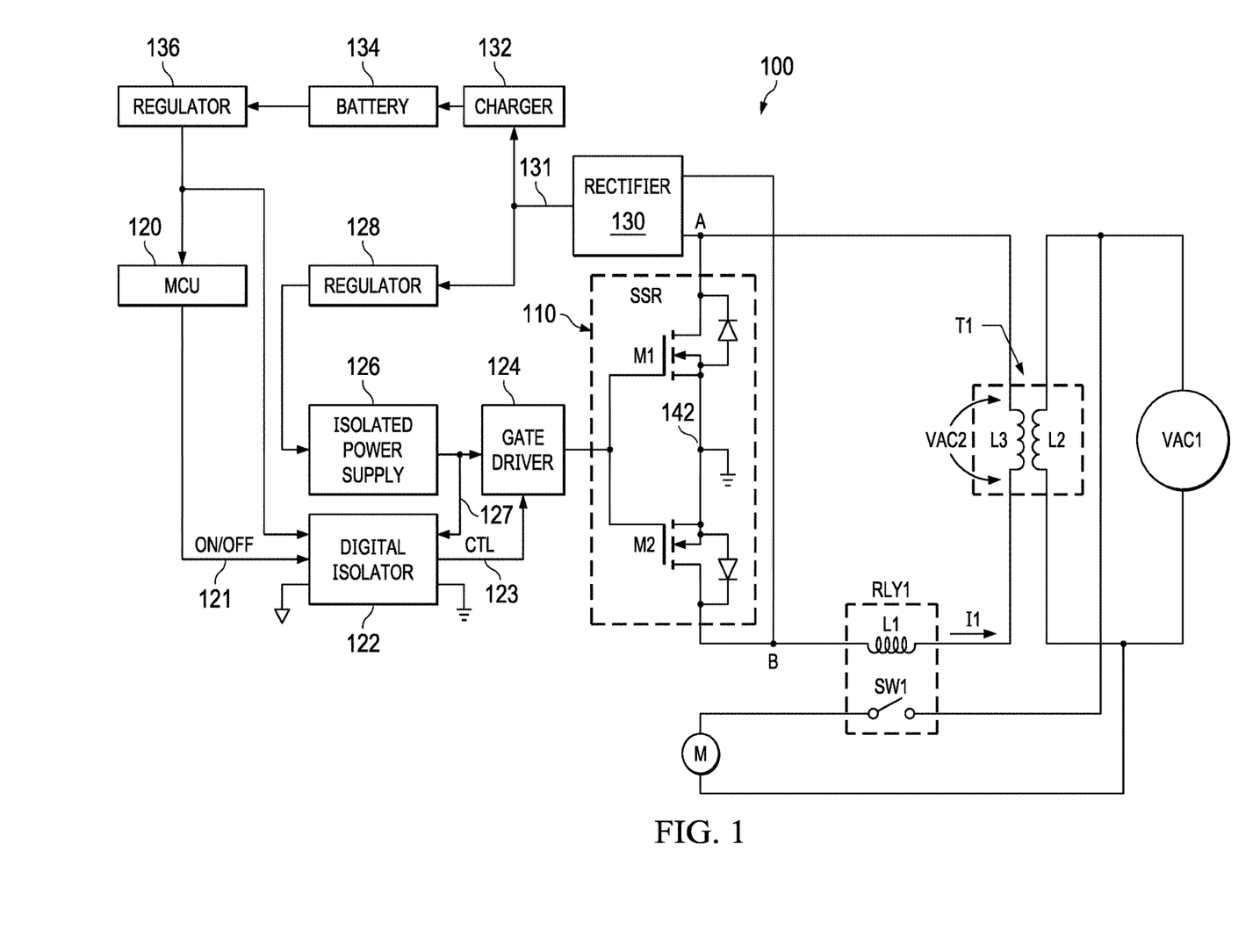
FIG. 1 is a circuit diagram illustrating an example of a circuit that includes a solid-state relay for powering a load such as a motor.

FIG. 1 shows an example of a system 100 including a solid-state relay used to turn on and off a load in which there is no continuously available voltage to power the solid-state relay. Such examples may be characteristic, for example, of thermostats used in air conditioning systems or other types of systems. In FIG. 1, motor M may represent a compressor or a fan in an air conditioning system, or another type of load in other systems. The motor M is coupled through a switch SW1 to an alternating current (AC) voltage source VAC1. In one example, VAC1 may be 240 VAC (or another voltage, e.g., 120 VAC). Switch SW1 is part an electromechanical relay RLY1 that also includes a coil L1. Responsive to a threshold amount of current (I1) flowing through coil L1, switch SW1 closes thereby turning on motor M.

FIG. 1 also shows the solid-state relay (SSR) 110, a microcontroller unit (MCU) 120, a digital isolator 122, a gate driver 124, an isolated power supply 126, voltage regulators 128 and 136, a rectifier 130, a battery charger 132, and a battery 134. The SSR 110, MCU 120, the digital isolator 122, the gate driver 124, the isolated power supply 126, the voltage regulators 128 and 136, the rectifier 130, the battery charger 132, and the battery 134 may be completely or partially included in a thermostat. The motor M may be, for example, a compressor or a fan of an air conditioning system in which the thermostat operates. However, numerous other use-cases exist for a solid-state relay.

The SSR 110 includes transistors M1 and M2. In some embodiments where M1 and M2 are implemented using metal-oxide-silicon field effect transistors (MOSFETs), each transistor M1 and M2 has a gate (control input) and a source and drain (a pair of current terminals). In the example of FIG. 1, transistors M1 and M2 comprise N-type MOSFETs (NMOS transistors). The gates of transistors M1 and M2 are coupled together and are coupled to an output of the gate driver 124. The sources of transistors M1 and M2 are coupled together at a terminal 142. Terminal 142 in this example is connected to ground. In other example embodiments, transistors M1 and/or M2 may be implemented using PMOS devices, bipolar transistors, junction transistors or other types of transistors.

The MCU 120 generates an ON/OFF signal 121 that, indirectly, turns the motor M on and off. For example, when the ON/OFF signal is high, the motor turns on, and when the signal is low then the motor turns off. The ON/OFF signal is provided to the digital isolator 122. The digital isolator 122 has two separate voltage supplies (also referred to as "rails"), each with a different ground, to thereby isolate the control side and the AC supply side of the SSR. The digital isolator 122 responds to an asserted (e.g., high) ON/OFF signal 121 by asserting a control signal (CTL) 123 to the gate driver 124. The gate driver 124 provides a control voltage to the gates of transistors M1 and M2 that is high enough to force the gate-to-source voltage (VGS) of transistors M1 and M2 to exceed their respective threshold voltages and cause the transistors to operate in saturation.

The example of FIG. 1 also shows a voltage transformer T1 comprising a primary winding L2 and a secondary winding L3. The drain of transistor M1 is coupled to one terminal of the secondary winding L3 (labeled terminal A). Coil L1 of the relay RLY1 is coupled between the drain of transistor M2 (labeled terminal B) and the opposing terminal of secondary winding L3. Responsive to the gate driver 124 generating a sufficiently high voltage to turn on both of transistors M1 and M2, current flows through transistors M1 and M2, secondary winding L3, and coil L1 of relay RLY1. Relay RLY1 is configured to cause switch SW1 to close if the current through coil L1 is more than a threshold amount (e.g., more than 1 mA). If no current I1 flows through coil L1, or if less than the threshold amount of current flows through coil L1, the switch SW1 will open and remain open. Accordingly, some current (less than the threshold amount) can flow through coil L1 without activating relay RLY1.

The transformer T1 is a step-down transformer and produces a voltage (VAC2) across its secondary winding L3 that is smaller than the voltage across its primary winding L2 (VAC1). When SSR 110 is in the off state (i.e., transistors M1 and M2 are off), the motor M is off. Further, the voltage difference between terminals A and B (i.e., the voltage difference between the terminals connected to the SSR 110) is approximately equal to VAC2. Accordingly, when the SSR 110 does not cause motor M to be on, the voltage VAC2 is present across terminals A and B.

Terminals A and B are connected to the rectifier 130, which may be a full wave rectifier. The output 131 of rectifier 130 is coupled to the battery charger 132 and to the voltage regulator 128. In one example, voltage regulator 128 is a buck converter, but can be implemented as other types of regulators. The battery charger 132 uses the rectified voltage from rectifier 130 to charge battery 134. The voltage from battery 134 is provided to the voltage regulator 136. The voltage regulator 136 may be a buck/boost converter, or other suitable type of regulator.

The voltage to power the MCU is from the voltage regulator 136. The voltage to power the isolated power supply 126 is from voltage regulator 128. Voltage 127 from the isolated power supply 126 is used to power the isolated side of the digital isolator 122 and the gate driver 124. When the SSR 110 is an off state, voltage VAC2 is available across terminals A and B and is provided to rectifier 130 to directly or indirectly power the MCU 120, the digital isolator 122, and to provide voltage to the isolated power supply 126 to thereby provide a suitable voltage for the gate driver 124.

With the SSR 110 in the off state, some current I1 does flow through coil L1. Current flows through coil L1 and through secondary winding L3, through the rectifier 130 via terminal A, and back to coil L1 via terminal B during one half cycle of VAC2, and in the opposite direction during the other half cycle of VAC2. As long as the magnitude of the current is below the threshold level of relay RLY1, switch SW1 will remain open and motor M will not turn on. Using current through coil L1 and the secondary winding L3 when motor M is off to power the MCU 120 (and other electronics) works as long as the current is below the threshold level of the relay RLY1, otherwise, the relay RLY1 may inadvertently energize thereby turning on the load M (when load M was not intended to be turned on). This current requirement can be a challenge depending on the collective current draw of, for example, the MCU 120, the isolated power supply 126, and the digital isolator 122. Some systems may also include displays (e.g., a display for a thermostat), wireless interfaces, etc., and the combined current draw of such components may be problematic in terms of adequately powering the circuitry without inadvertently turning on the motor M (which would occur if the current I1 through coil L1 were to exceed the trip point of the relay RLY1).

When the SSR 110 is in the on state (to turn on motor M), terminals A and B are essentially shorted together through serially-connected transistors M1 and M2. In this case, the voltage across terminals A and B becomes approximately 0V, and the voltage to power the MCU 120 and the non-isolated side of the digital isolator 122 is derived from the battery 134 via its voltage regulator 136. However, there is no voltage available to power the isolated power supply 126 to thereby maintain the transistors M1 and M2 in ON states, nor is there power to recharge the battery 134. Some systems may include a power multiplexer to supply power to the isolated power supply 126 by switching between the regulator 128 (when transistors M1 and M2 are off) and regulator 136 (when transistors M1 and M2 are on).

As explained above, power from the battery 134 is needed to power at least a portion of the circuitry shown in FIG. 1 (e.g., the MCU 120 and the isolated power supply 126) when a supply voltage between terminals A and B is unavailable due to SSR 110 being on. Unfortunately, battery 134 will be fully drained if the SSR 110 and thus load M remains on for too long of a period of time. The embodiments described below address this problem.

Figure 2:
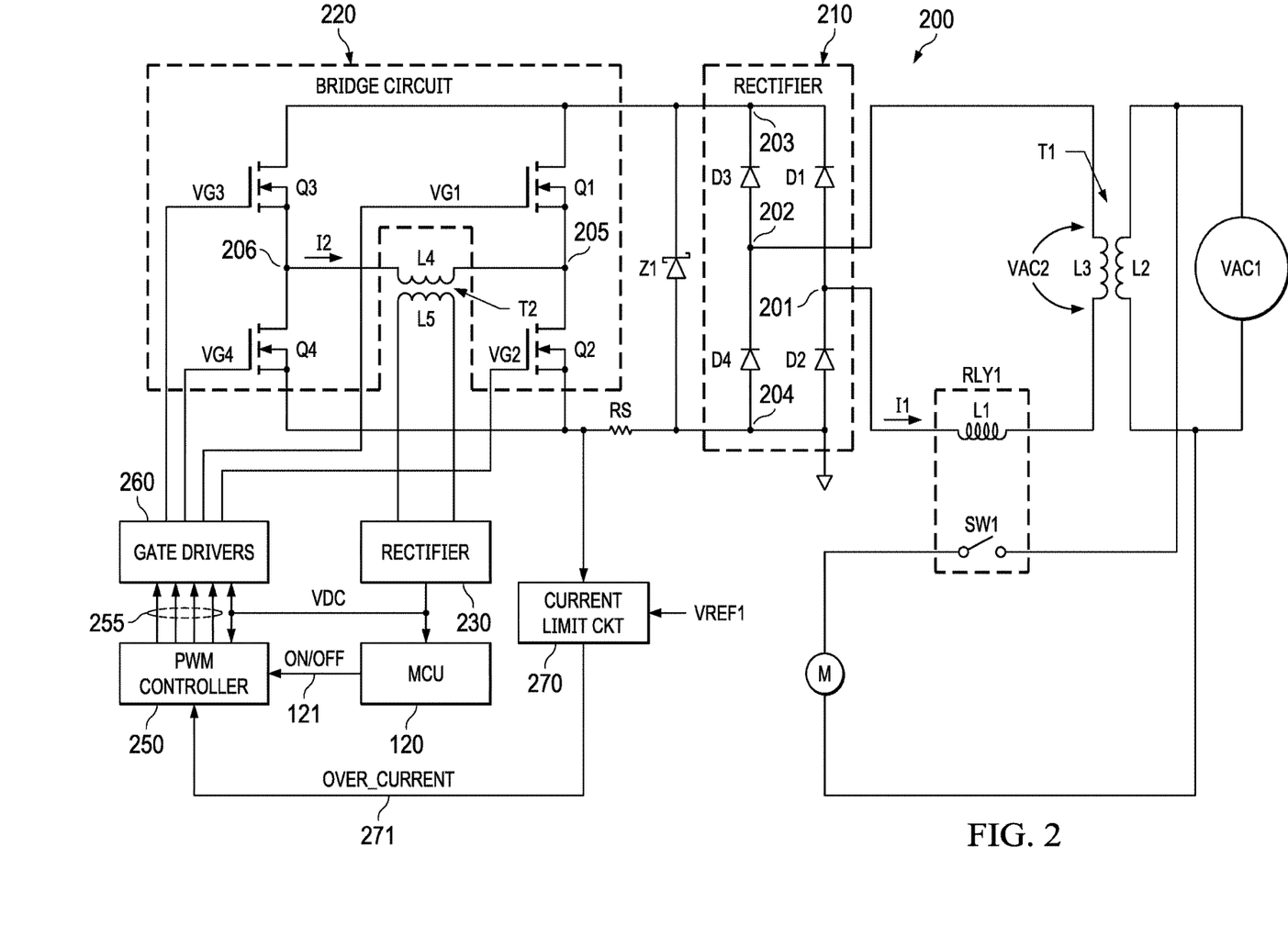
FIG. 2 is a circuit diagram illustrating a circuit for controlling the on and off state of a load in which the circuit includes a bridge circuit that is clocked at a frequency that is higher than the line frequency.

FIG. 2 shows an example of a system 200 that includes a current transformer T2 to derive a current from the stepdown transformer T1 to thereby power the MCU 120 and other electronics regardless of whether the motor M is on or off. System 200 includes the transformer T1, relay RLY1, motor M, and the MCU 120 as described above. The block labeled gate drivers 260 may include other electrical devices and circuits that are powered by the voltage VDC output by rectifier 230. With reference to the example of FIG. 1, gate drivers 260 may include the digital isolator 122, gate driver 124, and isolated power supply 126. In addition, system 200 includes rectifiers 210 and 230, Zener diode Z1, transistor bridge circuit 220, a pulse width modulation (PWM) controller 250, gate drivers 260, and a current limit circuit 270.

In this example, the rectifier 210 includes four diodes D1, D2, D3, and D4 configured as a full-wave rectifier. The anode of diode D1 is coupled to the cathode of diode D2 at a node 201, and the anode of diode D3 is coupled to the cathode of diode D4 at a node 202. The cathodes of diodes D1 and D3 are coupled together at node 203, and the anodes of diodes D2 and D4 are coupled together at node 204. Nodes 201 and 202 represent the input of rectifier 210. Node 201 is coupled to coil L1 of relay RLY1, and node 202 is coupled to the secondary winding L3 as shown. The rectifier 210 rectifies the AC voltage VAC2 from the secondary winding L3 of transformer T1. The output of rectifier 201 is the rectified voltage difference between nodes 203 and 204.

Zener diode Z1 is coupled across the output 203/204 of rectifier 210. The bridge circuit 220 also is coupled to the output 203/204 of rectifier 210. In this example, a sense resistor RS is coupled between node 204 and the bridge circuit 220, although the sense resistor RS can be placed in other locations within the circuit. The sense resistor RS is a relatively low resistance device or circuit (e.g., 1 ohm) that produces a voltage difference across its terminals proportional to the current through the sense resistor. As will be explained below, the current through the sense resistor RS is also the current I1 through coil L1 of relay RLY1. When the motor M is intended to be off, the current limit circuit 270 monitors the current through the sense resistor RS and outputs a control signal 270 (OVER_CURRENT) to the gate drivers 260 (or alternatively to the PWM controller 250) to cause the transistors of the bridge circuit 220 to be off thereby ensuring that the current I1 through coil L1 is below the threshold level for relay RLY1.

In this example, the bridge circuit 220 includes four transistors Q1, Q2, Q3, and Q4. Transistors Q1-Q4 are N-channel metal oxide semiconductor field effect transistors (NMOS transistors), but can be implemented as other transistor types in other examples. The drains of transistors Q1 and Q3 are coupled together and to node 203. The sources of transistors Q2 and Q4 are coupled together and, through sense resistor RS, to node 204. The source of transistor Q1 is coupled to the drain of transistor Q2 at node 205. The source of transistor Q3 is coupled to the drain of transistor Q4 at node 206. Current transformer T2 includes a primary winding L4 and a secondary winding L5. The primary winding L4 is coupled between nodes 205 and 206 of the bridge circuit 220. The secondary winding L5 is coupled to rectifier 230. Rectifier 230 rectifies the time-varying voltage from the secondary winding L5 of the current transformer T2 and provides a rectified output voltage VDC to the MCU 120, PWM controller 250, and gate drivers 260. A direct current (DC)-to-DC converter may be included between the output of rectifier 230 and PWM controller 250, gate drivers 260, and MCU 120 to convert the rectified output DC voltage (VDC) to a different DC voltage level (or multiple DC voltages) suitable for use by the MCU, PWM controller, and the gate drivers. The DC voltage VDC is the operating voltage for the MCU 120, gate drivers 260, and the PWM controller.

The MCU 120 provides the ON/OFF signal 121 to the PWM controller 250. The PWM controller 250 generates PWM signals 255 to turn on and off each of the transistors Q1-Q4 according to the timing protocol described below. As there are four transistors Q1-Q4 in the example bridge circuit 220, the PWM controller 250 generates four PWM signals 255, one for each of the transistors Q1-Q4. The PWM signals from the PWM Controller 250 are provided to the gate drivers 260. The gate drivers 260 includes a separate gate driver for each of the four transistors Q1-Q4 to produce a suitable voltage on the gate of the respective transistor to turn that transistor on and off as specified by the respective PWM signal 255. The gate signal for transistor Q1, Q2, Q3, and Q4 are shown, respectively, as gate signal VG1, VG2, VG3, and VG4.

As will be explained in greater detail below, the PWM controller 250 generates PWM signals 255 at a higher frequency than the frequency of VAC1 and VAC2. In one example, the frequency of VAC1 and VAC2 is 50 or 60 Hz (e.g., the line frequency of the power mains to the building in which the system 200 operates) and the frequency of PWM signals 255 is higher than the line frequency. In one example, the frequency of the PWM signals is at least 100 Hz. In another example, the frequency of the PWM signals is at least 10 KHz or at least 20 KHz. The on/off state of transistors Q1-Q4 of the bridge circuit 220 are such that a time varying current (I2) flows through the primary winding L4 of the current transformer, thereby inducing a corresponding time-varying current in the secondary winding L5 to provide power to operate the MCU 120, PWM controller 250, and gate drivers 260. As will be illustrated in FIG. 10, the time-varying current is a step-wise approximation of a sinusoidal current. In one example, current transformer T2 includes an iron core with both the primary and secondary windings L4 and L5 wound on the iron core. The size of the iron core is characterized by its cross-sectional area and is inversely proportional to the operating frequency of the transformer. Accordingly, the size of the current transformer T2 advantageously can be made smaller if higher frequencies are used for the PWM signals 255. That is, the size of the current transformer T2 can advantageously be reduced if higher frequencies are implemented by the PWM controller 250. A smaller current transformer T2 thus helps to reduce the overall size of system 200.

Figure 3:
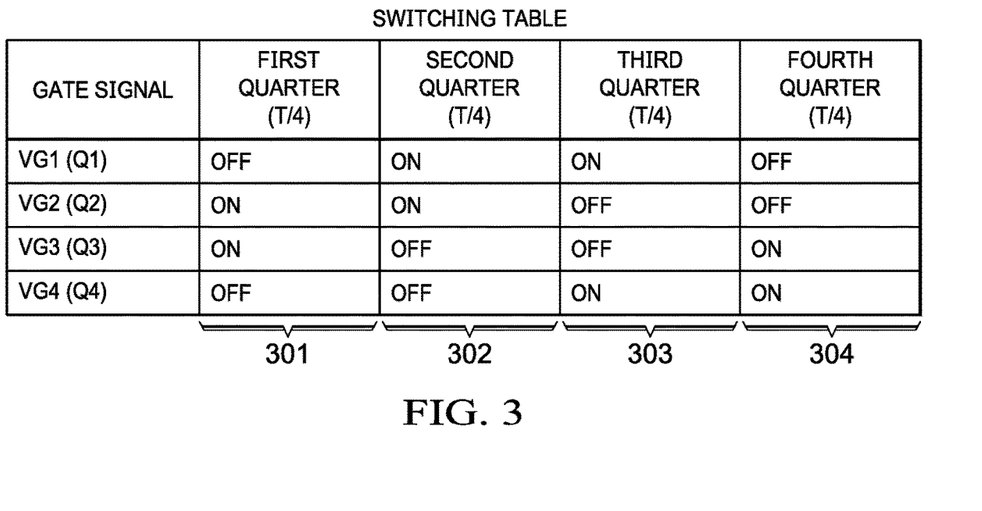
FIG. 3 is a switching table for the bridge circuit in accordance with an example.
Figure 4:
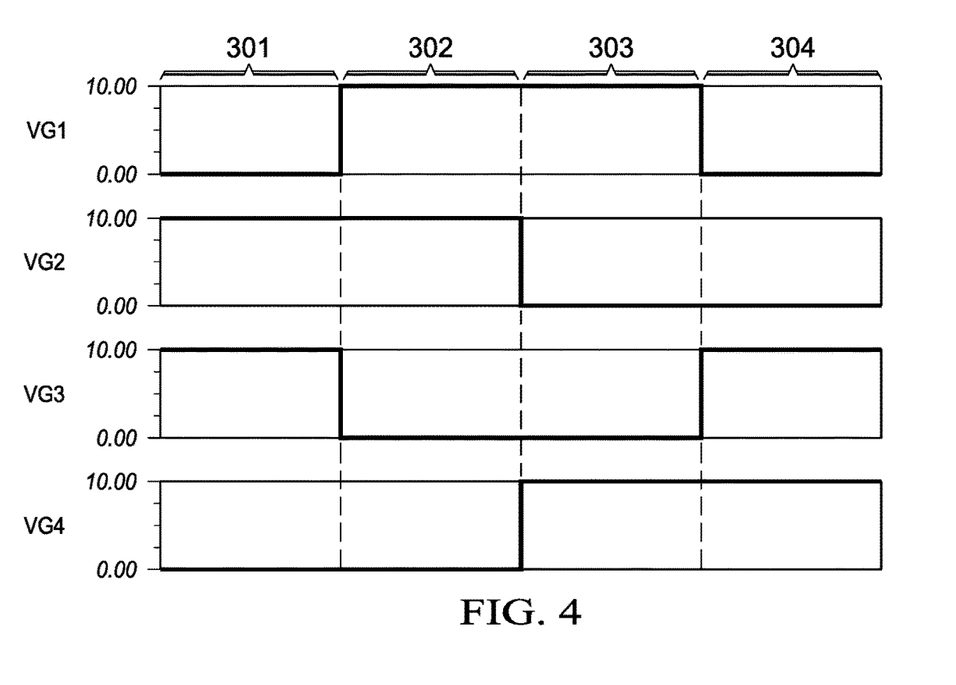
FIG. 4 is a timing diagram illustrating the operation of the bridge circuit in accordance with an example.

FIG. 3 is a table illustrating the switching protocol implemented by the PWM controller 250 for turning on and operating the motor M. The switching protocol is a repeating pattern. A collection of pattern portions defines each pattern period that repeats. The table in FIG. 3 is for a single pattern period and is divided into four pattern portions 301, 302, 303, and 304. The left-most column in the table lists the gate signals for the transistors Q1-Q4. FIG. 4 is a timing diagram showing the which transistors' gate signals are active (corresponding transistor being on) during each of the pattern portions 301-304.

During pattern portion 301, transistors Q2 and Q3 are on, and transistors Q1 and Q4 are off. In FIG. 4, pattern portion 301 is shown with the gate signals VG2 and VG3 for transistors Q2 and Q3 being active high, and the gate signals VG1 and VG4 for transistors Q1 and Q4 being low. Referring to FIG. 2, with transistors Q2 and Q3 being on, current between nodes 203 and 204 of rectifier 210 flows through transistor Q3, through winding L4 (current I2), through transistor Q2, and through the sense resistor RS.

During pattern portion 302, transistors Q1 and Q2 are on, and transistors Q3 and Q4 are off. In FIG. 4, pattern portion 302 is shown with the gate signals VG1 and VG2 for transistors Q1 and Q2 being active high, and the gate signals VG3 and VG4 for transistors Q4 and Q4 being low. With transistors Q1 and Q2 being on, current between nodes 203 and 204 of rectifier 210 flows through transistor Q1, through transistor Q2, and through the sense resistor RS. In pattern portion 302, current does not flow through primary winding L4 of the current transformer.

During pattern portion 303, transistors Q1 and Q4 are on, and transistors Q2 and Q3 are off. In FIG. 4, pattern portion 303 is shown with the gate signals VG1 and VG4 for transistors Q1 and Q4 being active high, and the gate signals VG2 and VG3 for transistors Q2 and Q3 being low. With transistors Q1 and Q4 being on, current between nodes 203 and 204 of rectifier 210 flows through transistor Q1, through winding L4 (current I2), and through transistor Q4, and through the sense resistor RS. The current flows through the primary winding L4 during pattern portion 303 in the opposite direction than during pattern portion 301.

During pattern portion 304, transistors Q3 and Q4 are on, and transistors Q1 and Q2 are off. In FIG. 4, pattern portion 304 is shown with the gate signals VG3 and VG4 for transistors Q3 and Q4 being active high, and the gate signals VG1 and VG2 for transistors Q1 and Q2 being low. With transistors Q3 and Q4 being on, current between nodes 203 and 204 of rectifier 210 flows through transistor Q3, through transistor Q4, and through the sense resistor RS. In pattern portion 304, current does not flow through primary winding L4 of the current transformer.

By switching the on and off state of the transistors Q1-Q4 within the bridge circuit 220 as illustrated in the example switching protocol of FIGS. 3 and 4, a time-varying current I2 flows through the primary winding L4 of the current transformer T2. The time-varying current through the primary winding L4 induces a time-varying current in the secondary winding L5, which is then rectified by rectifier 230 to produce an approximately DC voltage (VDC) to operate the MCU 120, PWM controller 250, and gate drivers 260. The PWM controller 250 repeats the pattern portions 301-304 at a frequency that is higher than the line frequency of VAC1 and VAC2. In the examples provided herein, the frequency implemented by the PWM controller 250 can be at least 100 Hz, at least 20 KHz, etc. In one example, each pattern portion is one-fourth of the period of the repeating pattern. Accordingly, each transistor Q1-Q4 is turned on by the PWM controller 250 for one-half of each period. In one example, the time durations of pattern portions 301 and 303 should be same to eliminate DC biasing of the transformer T2. The time durations of pattern portions 302 and 304 can be lower or higher than time durations of pattern portions 301 and 303.

When the motor M (other load to be powered by the line voltage VAC1) is to be on, current flows from the secondary winding L3 of step-down transformer T1, through the diodes D1-D4 of rectifier 210, and through whichever pair of transistors Q1-Q4 is on (different pairs of transistors are on in accordance with the repeating pattern of FIG. 3). For example, during the positive half-cycle of VAC2, current flows from the secondary winding L3, through diode D3, through the bridge circuit's pair of transistors that are on, through diode D2, and through coil L1 of relay RLY1 back to the secondary winding L3. During the negative half-cycle of VAC2, current flows in the opposite direction from the secondary winding L3, through coil L1 of relay RLY1, through diode D1, through the bridge circuit's pair of transistors that are on, and through diode D4 back to the secondary winding L3. The magnitude of the current is greater than the threshold level of the relay RLY1 and thus switch SW1 closes thereby powering on motor M.

When the motor M (other load to be powered by the line voltage VAC1) is to be off, current still flows between the secondary winding L3 of the step-down transformer T1, rectifier 210, bridge circuit 220, and coil L1 of relay RLY1, but needs to be at a magnitude below the threshold level of relay RLY1. To maintain the average current through coil L1 below the trip point of the relay, the switching protocol of FIG. 3 is modified to include an OFF state in which all four of the transistors Q1-Q4 of bridge circuit 220 are off. When whichever pair of transistors that are presently on are turned off (thereby turning off all four transistors), a sudden change occurs in the current through the secondary winding L3 of transformer T1, thereby creating a large kick-back voltage from transformer T1. The Zener diode Z1 is reversed bias between nodes 203 and 204 and, when a pair of transistors of the bridge circuit 220 is on, the voltage across the Zener diode Z1 is below the reverse cutoff voltage of the Zener diode Z1. Accordingly, no current flows through the Zener diode Z1 when any given pair of transistors per FIG. 3 is on.

However, during the OFF state, which ensures that the magnitude of the current through the relay RLY1 is below its trip point, none of the transistors Q1-Q4 are on, and due to the kick back voltage noted above, the voltage across the Zener diode Z1 (between nodes 203 and 204) may exceed the reverse cutoff voltage of diode Z1. When that happens, current from transformer T1 flows though diodes D1-D4 of rectifier 210 as explained above, and also through the Zener diode Z1. No current flows through any of the transistors Q1-Q4 of the bridge circuit 220. Neglecting the forward voltage drop of diodes D1-D4, when all of the transistors are turned off, the voltage across coil L1 of relay RLY1 changes from VAC2 to (VAC2−V_Z1) where V_Z1 is the voltage drop across the Zener diode Z1. The Zener diode Z1 is selected to have a reverse cutoff voltage that is greater than the magnitude of VAC2. The voltage polarity across the relay load thus decreases thereby causing the current through the coil L1 to decrease and be smaller than the trip point of the relay RLY1.

Figure 5:
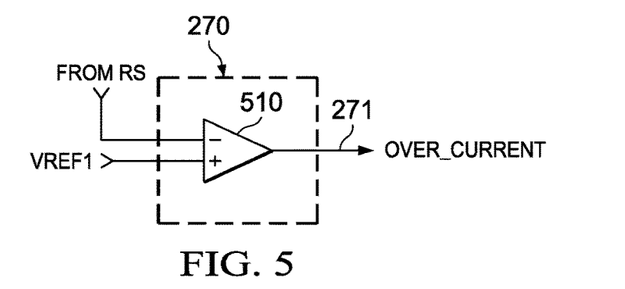
FIG. 5 is an example implementation of a current limit circuit included in the embodiment of FIG. 2.

The current limit circuit 270 asserts the OVER_CURRENT signal 271 to an activate state (e.g., logic high) responsive to the current through the sense resistor RS being greater than a threshold. The voltage across the sense resistor RS is proportional to its current. The threshold is shown in FIG. 2 as a reference voltage VREF1. VREF1 may be generated by MCU 120 or by external components and can be varied based on the system requirements. Response to the voltage across the sense resistor RS being greater than VREF1, the current limit circuit 270 asserts the OVER_CURRENT signal to a logic low state. FIG. 5 shows an example implementation of the current limit circuit 270 as a comparator 510. Comparator 510 has an inverting (−) input and a non-inverting input (+). The signal from the sense resistor RS is coupled to the inverting input of comparator 510, and the reference voltage VREF1 is coupled to the non-inverting input. The OVER_CURRENT signal 271 is the output signal from the comparator 510 and is logic high when VREF1 is larger than the sense resistor voltage. The comparator 510 forces OVER_CURRENT to be logic low when the sense resistor voltage is larger than VREF1. The comparator 510 implements hysteresis. The comparator output (OVER_CURRENT) becomes logic low upon the sense resistor's signal exceeding an upper threshold value, and becomes logic high upon the sense resistor's signal falling below a lower threshold value. VREF1 may represent a voltage that is halfway between the upper and lower threshold values. In some examples, the current limit circuit 270 may include an amplifier to boost the voltage drop across the sense resistor before being compared with VREF1 by the comparator 510.

Figure 6:
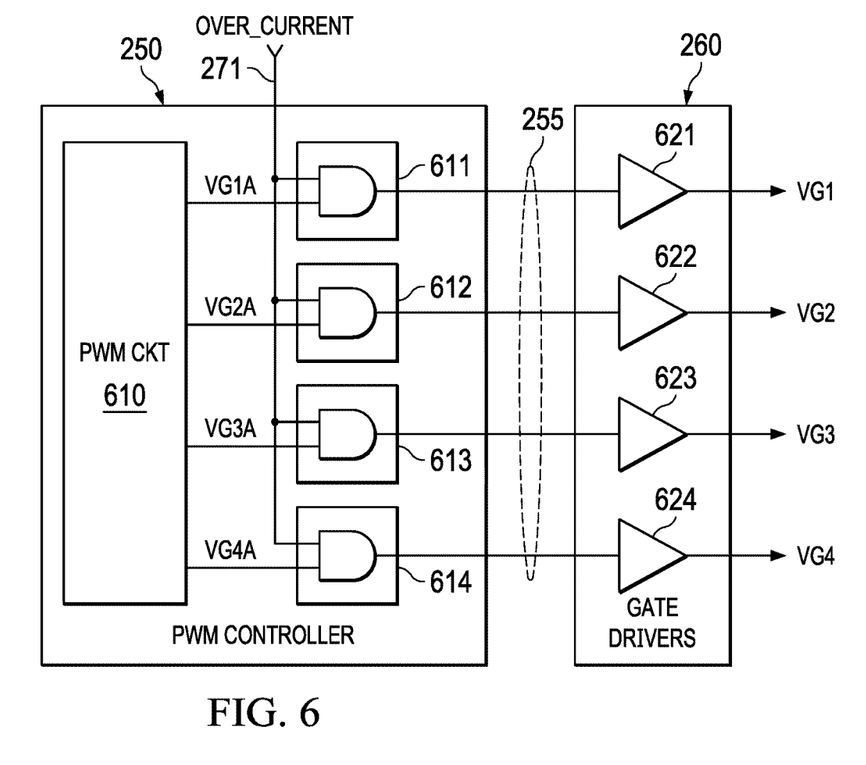
FIG. 6 is a block diagram of an example implementation of a pulse width modulation (PWM) controller and gate drivers included in the embodiment of FIG. 2.

When the MCU 120 issues the ON/OFF signal 121 to a logic state to force the motor M to be in the off state, the PWM controller 250 responds to an assertion of the OVER_CURRENT signal 271 (that the current through the sense resistor RS) has exceeded the threshold by forcing all of the PWM signals 255 to a logic state to cause their respective transistors Q1-Q4 to be off. FIG. 6 shows an example implementation of the PWM controller 250 and the gate drivers 260. The PWM controller 250 includes a PWM circuit 610 configured to generate signals VG1A, VG2A, VG3A, and VG4A which correspond to each of the respective transistor gate signals VG1, VG2, VG3, and VG4. The PWM circuit 610 implements the switching protocol illustrated in the example of FIG. 3.

The PWM controller 250 also includes a logic gate (or combination of logic gates) 611, 612, 613, and 614 for each of the signals VG1A-VG4A. In the example of FIG. 6, the logic gate 611-614 is an AND gate. One input of each AND gate is coupled to the PWM circuit 610 to receive the corresponding signal VGA1-VGA4. Another input of each AND gate is coupled to the output of the comparator 510 and thereby receives the OVER_CURRENT signal 271. Responsive to the voltage from the sense resistor RS (which is proportional to the current through relay RLY1) being smaller than VREF1, OVER_CURRENT is logic high, and the output of each AND gate is logically equal to the respective input signal VG1A-VG4A. However, responsive to the voltage from the sense resistor RS exceeding VREF1, OVER_CURRENT 271 becomes logic low, which thereby forces the output signal from each AND gate to be logic low. The outputs of the AND gates are the PWM signals 255 described above, and are provided to respective gate drivers 621, 622, 623, and 624 (collectively, gate drivers 260). The AND gates thus gate-off the PWM signals 255 forcing the transistors Q1-Q4 to be off.

Accordingly, regardless of the logic state of the PWM circuit's output signals VG1A-VG4A, the PWM signals 255 to the gate drivers 260 are logic low responsive to the current through the relay RLY1 exceeding the threshold. The threshold, VREF1, is configured to be a voltage low enough to prevent the current through the relay RLY1 from energizing the relay when the MCU 120 issues the ON/OFF signal 121 to be in the logic state to force the motor M to be off. As the relay current decreases, the voltage from the sense resistor eventually falls below VREF1, thereby causing the OVER_CURRENT signal 271 to become logic high. With the OVER_CURRENT signal 271 being logic high, the VG1A-VG4A signals from the PWM circuit 610 flow through to the gate drivers 260 to thereby turn on and off the transistors Q1-Q4 according to the example of the switching protocol of FIG. 3. VREF1 may be generated by MCU 120 or by means of external components and can be varied based on the system requirements.

In the example of FIG. 2, the sense resistor RS is coupled between the sources of transistors Q2, Q4 and node 204 to sense the current. In another example, current sensing can be implemented using a hall sensor or other current sensing technologies.

In an implementation, upon startup, the MCU 120 and the PWM controller 250 can turn on either transistor pair Q1 and Q4 or transistor pair Q2 and to determine the relay's threshold (trip) current by monitoring the voltage drop across the sense resistor RS. When the relay RLY1 activates, current I1 may momentarily dip due to a momentary back electromotive force (EMF) generated by the relay coil and this value can be stored by the MCU 120 (to configure VREF1) to ensure the current remains lower than this limit when the relay RLY1 is intended to be in the off state.

Figure 7:
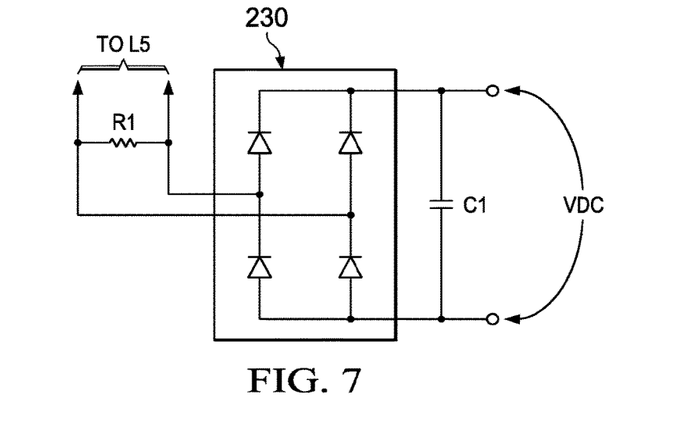
FIG. 7 is a circuit that generates a direct current (DC) voltage from a current transformer in accordance with an example.

FIG. 2 shows an example in which a rectifier 230 rectifies the voltage from secondary winding L5. FIG. 7 shows an example in which the rectifier 230 is a full-wave diode bridge similar to that of the rectifier 210 of FIG. 2. A resistor R1 is coupled in parallel with secondary winding L5. Resistor R1 is operative to ensure the voltage across the secondary winding L5 is below a safety threshold. Resistor R1 can also be coupled across the output of rectifier 230. A capacitor C1 is coupled across the output of rectifier 230. Capacitor C1 is used to store energy and act as a filter to reduce the voltage ripple at the output of rectifier 230.

Figure 8:
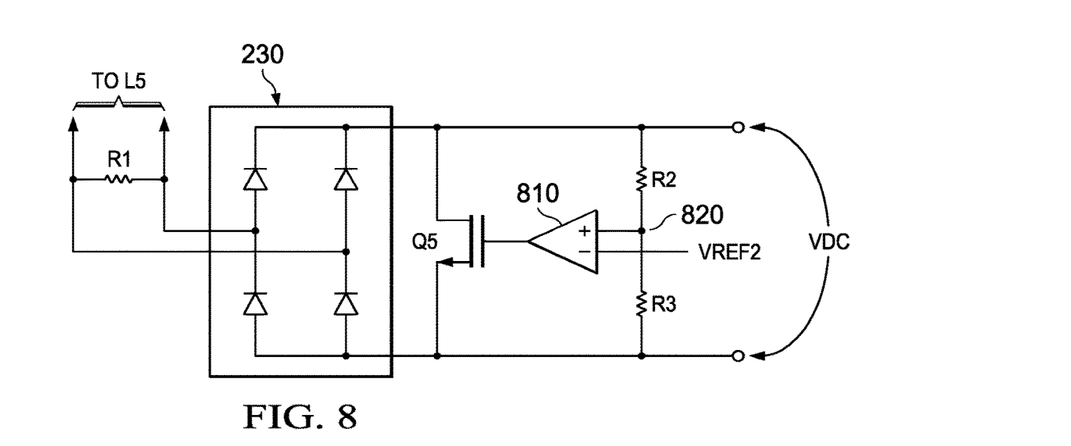
FIG. 8 is another circuit that generates a DC voltage from a current transformer in accordance with another example.

In the example of FIG. 8, a resistor is not present in parallel with secondary winding L5. Instead, a transistor Q5 is coupled across the output of the rectifier 230. The gate of transistor Q5 is driven by the output of a comparator 810. The inverting input of comparator 810 receives a reference voltage VREF2 (which may be the same or different voltage as VREF1). Resistors R2 and R3 form a voltage divider whose output voltage on node 820 is coupled to the non-inverting input of comparator 810. If the voltage on node 820 exceeds VREF2, the comparator's output becomes logic high thereby turning on transistor Q5 and reducing the voltage on the output of rectifier 230.

Figure 9:
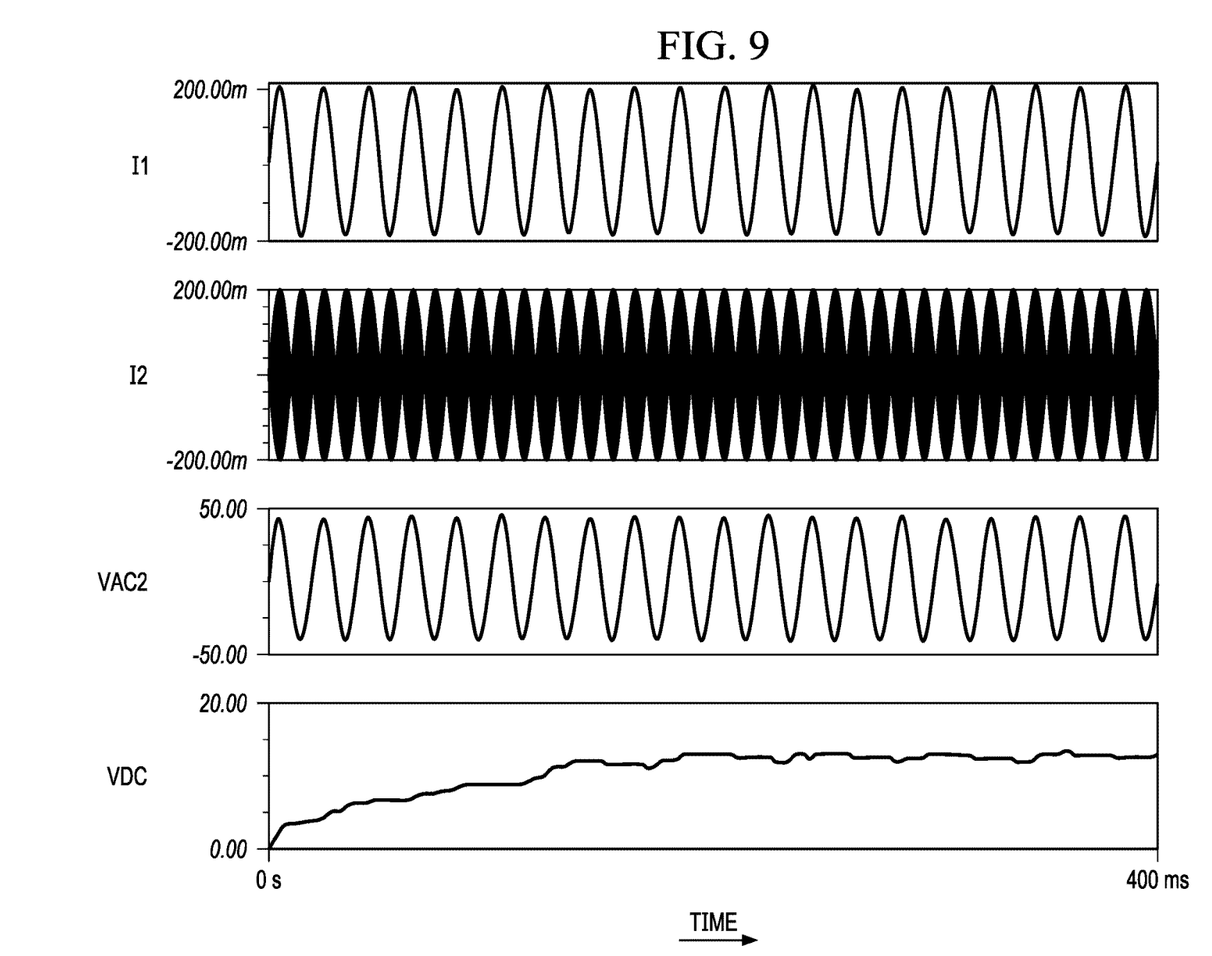
FIG. 9 are waveforms of currents and voltages within the circuit of FIG. 2 in accordance an example.

FIG. 9 includes example waveforms for relay current I1, primary winding L4 current I2, voltage VAC2, and the DC output voltage VDC for a period of time equal to 400 milliseconds (ms). The frequency of current I1 is the line frequency (50 Hz in this example). In this example, current I1 has a peak positive and negative peak of approximately +200 mA and −200 mA. The frequency of current I2 is substantially higher (e.g., 100 Hz or higher, 20 KHz or higher) due to the high frequency switching of transistors Q1-Q4 as controlled by the PWM controller 250. The value of current I2 depends on the instantaneous value of current I1. For example, when I1 is at the peak value of 200 mA (independent of polarity), the current I2 changes between +200 mA and −200 mA depending on the switching instants of Q1-Q4. The voltage VAC2 has a frequency that is the line frequency. Voltage VAC2 has a peak positive and negative voltage approximately equal to 45 V and −45 V in this example. At start-up, VDC is approximately 0 VDC and increases to its steady state value (e.g., +10 VDC) over the course of a number of cycles (e.g., 10 cycles) of the line frequency current I1.

Figure 10:
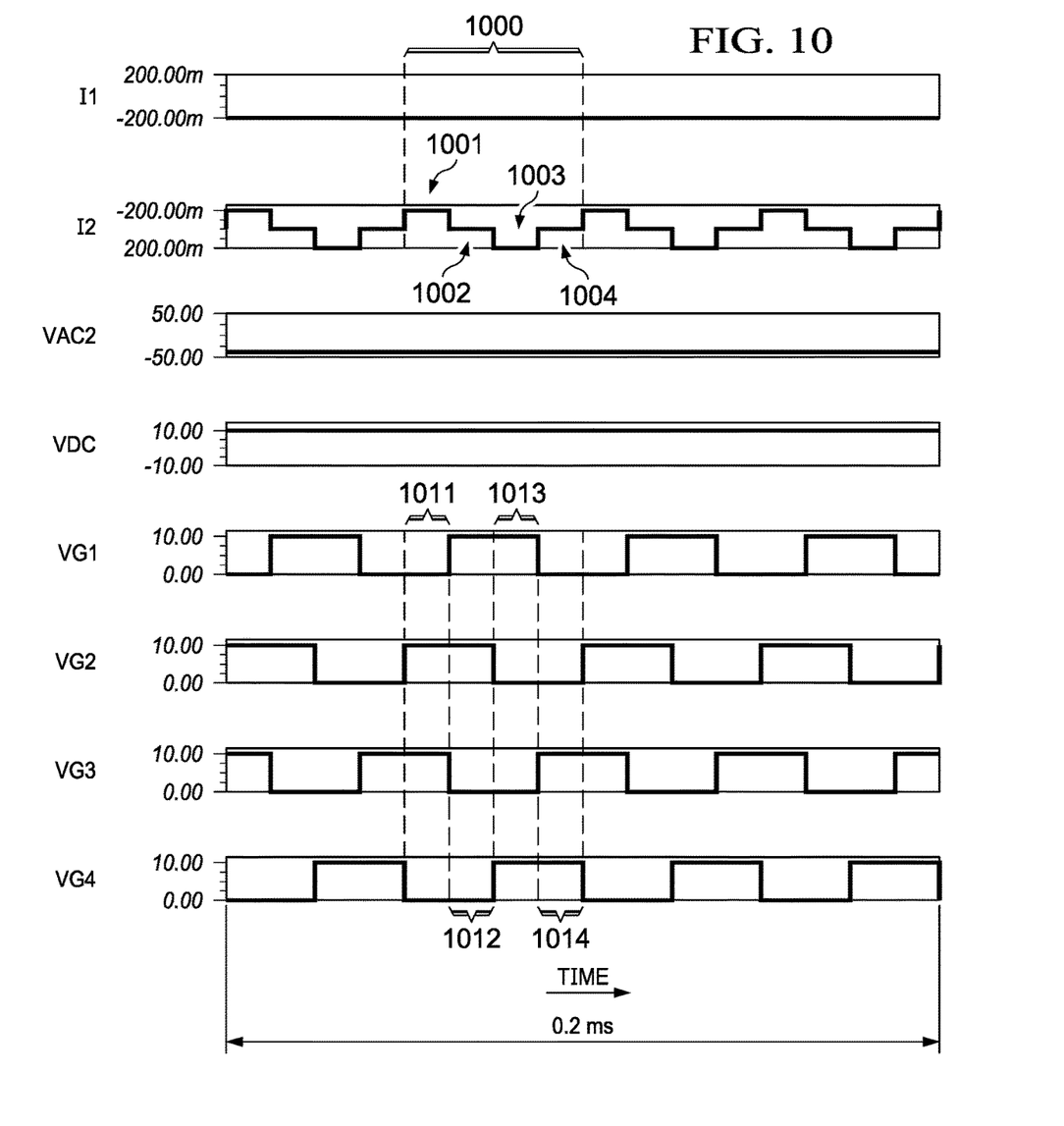
FIG. 10 are additional waveforms of currents and voltages within the circuit of FIG. 2 in accordance an example.

FIG. 10 shows example waveforms for currents I1 and I2, voltages VAC2 and VDC, and the gate signals VG1-VG4 at steady state operation for a much smaller time period than was the case in FIG. 9. The time period in the example of FIG. 10 is 0.2 ms. During that relatively short period of time, current I1 (which has a frequency of only 50 Hz in this example) is approximately flat, as is also the case for voltage VAC2. FIG. 10 shows an example in which I1 is at its maximum negative peak (−200 mA in this example). Current I2 varies between +200 mA and −200 mA in this example in approximately sinusoidal fashion. Each cycle 1000 includes four current steps identified as 1001, 1002, 1003, and 1004. With reference to FIGS. 2 and 3 as well as FIG. 10, step 1001 is the current I2 (+200 mA) when transistors Q2 and Q3 are on (VG2 and VG3 are both logic high as identified at 1011). At step 1002, current I2 is approximately 0A because transistors Q1 and Q2 are on (identified at 1012), and no current flows through the primary winding L4 as described above. Step 1003 is the current I2 (−200 mA) when transistors Q1 and Q4 are on (identified at 1013). At step 1004, current I2 is approximately 0A because transistors Q3 and Q4 are on (identified at 1014), and no current flows through the primary winding L4. The frequency of VG1-VG4 is substantially higher (e.g., 100 Hz or higher, 20 KHz or higher) than the frequency of I1 or VAC2.

Figure 11:
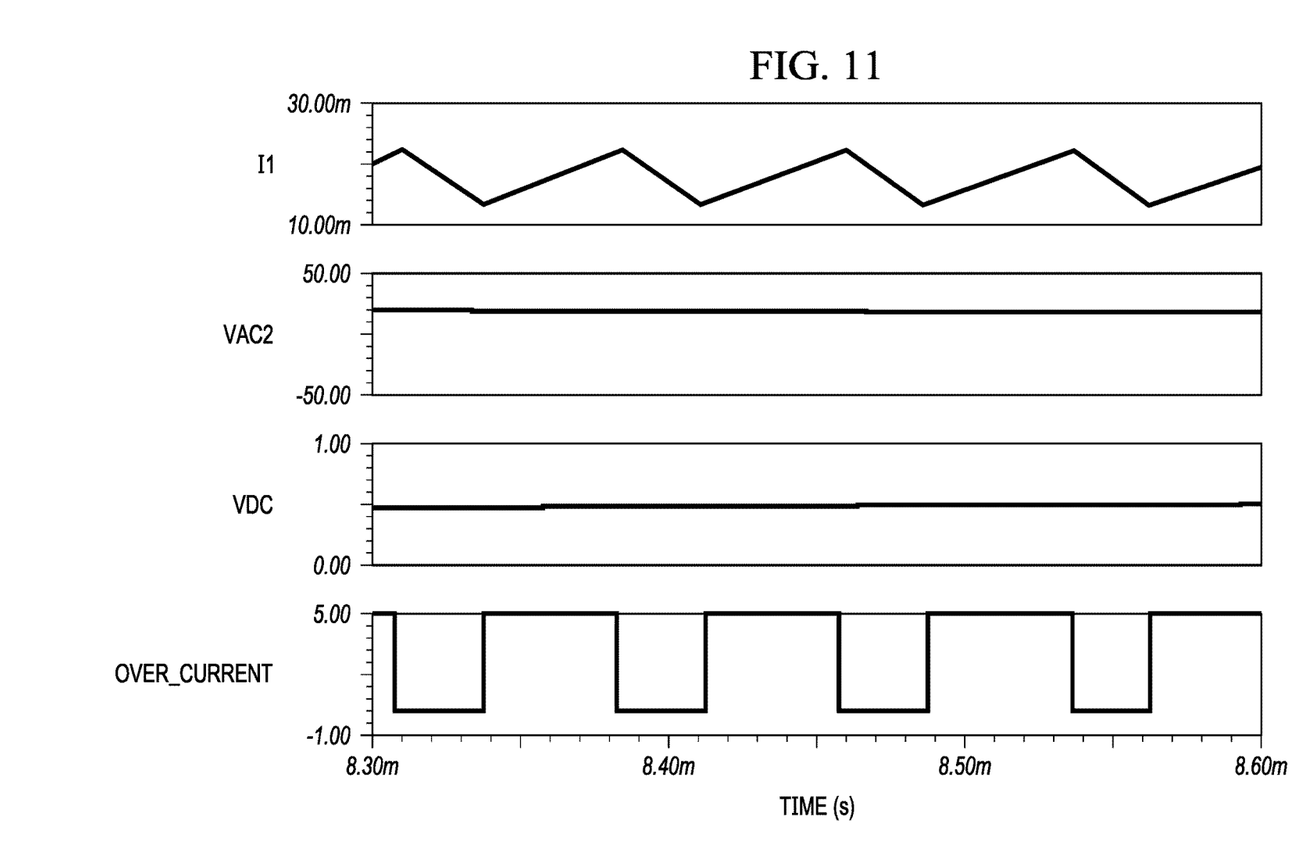
FIG. 11 are additional waveforms of currents and voltages within the circuit of FIG. 2 in accordance an example.

FIG. 11 illustrates the relationship between an example of current I1 and the OVER_CURRENT signal 271. As explained above, as I1 (the voltage across the sense resistor RS) exceeds the threshold VREF1, comparator 510 (FIG. 5) causes OVER_CURRENT to be logic low. When I1 falls below the threshold, the comparator forces OVER_CURRNT to be logic high.

In certain embodiments described herein, a mechanism (e.g., sense resistor RS) is included to determine whether the relay current I1 is becoming high enough that it may trip the relay RLY1 when, in fact, the motor M is not intended to be on. In another embodiment, no sense resistor nor any mechanism to detect relay current is included. Instead, OFF states in which all transistors Q1-Q4 are off are implemented by the PWM controller 250. For example, the switching protocol of FIG. 3 is modified to include the pattern portions shown as well as an additional pattern portion (OFF state).

Referring again to FIG. 2, in one embodiment, the PWM controller 250 and gate drivers 260 are fabricated on a common semiconductor die (integrated circuit, IC). In another embodiment, the PWM controller 250, gate drivers 260, and a DC-to-DC converter (converting the output voltage of rectifier 230 to a different voltage level, VDC) are fabricated on a common IC. In another embodiment, the PWM controller 250, gate drivers 260, current limit circuit 270 are fabricated on a common IC. In general, any two or more of the components shown in FIG. 2 can be fabricated on a common IC.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" ad "lead" are used interchangeably. Unless specifically stated to the contrary, these terms are generally used to mean an interconnection between or a terminus of a device element, a circuit element, an integrated circuit, a device, or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-type metal-oxide-silicon field effect transistor ("MOSFET") may be used in place of an n-type MOSFET with little or no changes to the circuit. Furthermore, other types of transistors may be used (such as bipolar junction transistors (BJTs)).

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

Modifications are possible in the described embodiments, and other embodiments are possible, within the scope of the claims.

What is claimed is:

1. A circuit, comprising:
    a first gate driver having a first gate driver input and a first gate driver output, wherein the first gate driver output is adaptable to be coupled to a first transistor;
    a second gate driver having a second gate driver input and a second gate driver output, wherein the second gate driver output is adaptable to be coupled to a second transistor;
    a third gate driver having a third gate driver input and a third gate driver output, wherein the third gate driver output is adaptable to be coupled to a third transistor;
    a fourth gate driver having a fourth gate driver input and a fourth gate driver output, wherein the fourth gate driver adaptable to be coupled to a fourth transistor; and
    a pulse width modulation (PWM) controller having first, second, third, and fourth PWM outputs coupled to respective first, second, third, and fourth gate driver inputs, wherein the PWM controller provides respective first, second, third, and fourth gate signals at the first, second, third, and fourth PWM outputs, respectively, in a repeating pattern that includes:
        a first pattern portion wherein the second and third PWM outputs are asserted and the first and fourth PWM outputs are deasserted;
        a second pattern portion in which the first and second PWM outputs are asserted and the third and fourth PWM outputs are deasserted;
        a third pattern portion in which the first and fourth PWM outputs are asserted and the second and third PWM outputs are deasserted; and
        a fourth pattern portion in which the third and fourth PWM outputs are asserted and the first and second gate signals are deasserted.

2. The circuit of claim 1, further including a current limit circuit having a current limit circuit input and a current limit circuit output, wherein the current limit circuit output is coupled to the PWM controller and provides a current limit control signal responsive to current through at least one of the first, second, third, or fourth transistors exceeding a threshold.

3. The circuit of claim 2, in which the current limit circuit output is coupled to the first, second, third, and fourth gate drivers, and wherein each of the respective first, second, third, and fourth gate drivers turn off the first, second, third, and fourth transistors, respectively, in response to the current limit circuit asserting the current limit control signal.

4. The circuit of claim 2, in which the current limit circuit includes a comparator having first and second comparator inputs and a comparator output, wherein the first comparator input is coupled to the current limit circuit input, the second comparator input is coupled to a threshold voltage terminal, and the comparator output is coupled to the current limit circuit output.

5. The circuit of claim 1, in which the PWM controller has a PWM controller input, and wherein:
    in response to a PWM controller input signal having a first logic state, the PWM controller implements the repeating pattern comprising the first, second, third, and fourth pattern portions; and
    in response to the PWM controller input signal having a second logic state, the PWM controller implements the repeating pattern until the respective first, second, third, and fourth gate drivers turn off the first, second, third, and fourth transistors, respectively, in response to a current through at least one of the first, second, third, and fourth transistors exceeding a threshold.

6. The circuit of claim 1, further including a Zener diode coupled to the first and second transistors.

7. The circuit of claim 1, in which the PWM controller is configurable to implement the repeating pattern at a frequency of at least 100 Hz.

8. The circuit of claim 1, in which the PWM controller is configurable to implement the repeating pattern at a frequency of at least 20 KHz.

9. A system, comprising:
a transformer;
a transistor bridge circuit including first, second, third and fourth transistors, wherein the transistor bridge circuit is coupled to the transformer;
first, second, third and fourth gate drivers, each respective gate driver coupled to a respective transistor of the first, second, third and fourth transistors;
a pulse width modulation (PWM) controller having PWM outputs coupled to a respective gate driver of the first, second, third and fourth gate drivers, wherein the PWM controller is configured to implement a repeating pattern, the repeating pattern including:
a first pattern portion in which a first pair of the gate drivers is activated to cause current to flow through the transformer;
a second pattern portion in which a second pair of the gate drivers is activated without current flowing through the transformer;
a third pattern portion in which a third pair of the gate drivers is activated to cause current to flow through the transformer; and
a fourth pattern portion in which a fourth pair of the gate drivers is activated without current flowing through the transformer; and
a current limit circuit having a current limit circuit input and a current limit circuit output, wherein the current limit circuit output is coupled to the gate drivers, and the current limit circuit is configurable to provide a current limit signal at the current limit circuit output responsive to current through the transistor bridge circuit exceeding a threshold.

10. The system of claim 9, in which the current limit circuit includes a comparator having first and second comparator inputs and a comparator output, wherein the first comparator input is coupled to the transistor bridge circuit, the second comparator input is coupled to a threshold voltage terminal, and the comparator output is coupled to the current limit circuit output.

11. The system of claim 9, in which the PWM controller is configured to implement the repeating pattern at a frequency of at least 100 Hz.

12. The system of claim 9, in which the PWM controller is configured to implement the repeating pattern at a frequency of at least 10 KHz.

\* \* \* \* \*